United States Patent [19]
Koeman et al.

[11] Patent Number: 5,821,760
[45] Date of Patent: Oct. 13, 1998

[54] METHOD AND APPARATUS FOR MEASURING NEAR-END CROSS-TALK IN PATCH CORDS

[75] Inventors: Henriecus Koeman, Edmonds; Jeffrey S. Bottman, Seattle, both of Wash.

[73] Assignee: Fluke Corporation, Everett, Wash.

[21] Appl. No.: 692,835

[22] Filed: Jul. 31, 1996

[51] Int. Cl.⁶ .......................... G01R 27/28; G01R 31/02
[52] U.S. Cl. ........................................... 324/628; 324/539
[58] Field of Search .................................. 324/539, 540, 324/620, 628

[56] References Cited

U.S. PATENT DOCUMENTS

| | | | |
|---|---|---|---|
| 4,524,321 | 6/1985 | Jablway et al. | 324/540 |
| 5,063,351 | 11/1991 | Goldthorp et al. | 324/628 |
| 5,185,735 | 2/1993 | Ernst | 370/13 |
| 5,502,391 | 3/1996 | Sciacero et al. | 324/628 |
| 5,530,367 | 6/1996 | Bottman | 324/616 |
| 5,532,603 | 7/1996 | Bottman | 324/628 |
| 5,539,321 | 7/1996 | Sciacero et al. | 324/628 |
| 5,548,222 | 8/1996 | Jensen et al. | 324/628 |
| 5,559,427 | 9/1996 | Hinds et al. | 324/539 |
| 5,570,029 | 10/1996 | Bottman et al. | 324/628 |
| 5,629,628 | 5/1997 | Hinds et al. | 324/628 |
| 5,698,985 | 12/1997 | Bottman | 324/628 |
| 5,731,706 | 3/1998 | Koeman et al. | 324/628 |

OTHER PUBLICATIONS

"A Time Domain Crosstalk Test For Cables", Brooks et al., International Wire & Cable Symposium, (13–15 Nov., 1979).

*Primary Examiner*—Glenn W. Brown
*Attorney, Agent, or Firm*—George T. Noe

[57] ABSTRACT

A pulse-based local area network (LAN) cable test instrument provides a measurement of the cross-talk characteristic of a LAN patch cord as a function of frequency in order to evaluate its relative performance and workmanship of assembly. A LAN cable test instrument applies a test signal in the form of narrow pulses to a selected transmission line of a LAN patch cord while the cross-talk response induced in another transmission line in the same LAN patch cord is measured and stored as a time record in digital memory. The near-end and far-end pulse responses are separated in the time record, leaving only the near-end pulse response. The LAN cable test instrument analyzes the near-end pulse response by performing a discrete Fourier transform on the time record to provide cross-talk versus frequency information. The same test may then be performed on the far-end end of the patch cord to obtain a complete test of the quality of workmanship at both ends of the patch cable.

25 Claims, 7 Drawing Sheets

METHOD AND APPARATUS FOR MEASURING NEAR-END CROSS-TALK IN PATCH CORDS

BACKGROUND OF THE INVENTION

This invention relates generally to electrical cable testing and troubleshooting, and in particular to measuring the cross-talk characteristics of local area network patch cords.

Local area networks (LAN's) now connect a vast number of personal computers, workstations, printers, and file servers in the modern office. A LAN system is typically implemented by physically connecting all of these devices with copper-conductor twisted-wire pair ("twisted-pair") LAN cables, the most common being an unshielded twisted-pair (type "UTP") LAN cable which is 8-wire cable which is configured as 4 twisted-pairs. Each of the four twisted-pairs function as a transmission line which conveys a data signal through the LAN cable. Each end of the LAN cable is commonly terminated in a modular-type connector according to the international standard IEC 603-7 with pin assignments of type "RJ-45" which is referred to as a modular (RJ-45) connector. Modular (RJ-45) connectors may be in the form of plugs or jacks. A mated plug and jack is considered a connection.

In a typical installation, LAN cables may be routed through walls, floors, and ceilings of the building. LAN cable systems require constant maintenance, upgrades, and troubleshooting because LAN cables and connectors are subject to breakage, offices and equipment must be moved, and new equipment is added. A relatively short length of LAN cable with a connector mounted on each end is commonly referred to as a patch cord. Patch cords are used to provide the interconnect between the fixed wiring of a building and the movable equipment at each end of the LAN cable system.

The relative speed of data communication over LAN cable systems has been steadily increasing. Data rates in excess of 100 megabits per second are increasingly common. Copper wire LAN cable systems, closely related to traditional multiconductor telephone cable systems commonly found in commercial buildings, have been pushed to accommodate these higher data rates. Copper wire LAN cable systems have the advantage over their optical fiber counterparts of being substantially less expensive and more versatile. However, the increasing demands for network speed and associated bandwidth have been accompanied by increased burdens on the network specialist to maintain network reliability in the face of more esoteric problems encountered at higher data rates.

The tasks of installing, replacing, or re-routing LAN cables typically fall on a professional cable installer or in-house network specialist. During the installation phase, each cable is routed through the building and a connector is attached to each end of the new cable. Each wire in the cable must be connected to its proper respective electrical connection on both ends of the cable in order for the LAN connection to function. A LAN cable system that has been improperly installed, or has faulty cables or connectors, can result in data transmission errors. Therefore, the LAN cable system, including the constituent patch cords, must be tested to verify proper connectivity and transmission performance.

Merely obtaining proper electrical connections through a particular network link is no longer sufficient to ensure a properly functioning LAN cable system. More subtle problems can surface that may cumulatively destroy network performance at higher data rates. For this reason, LAN cables are now classified into different performance levels based on their ability to handle high speed data traffic. The network specialist must now be careful to select the appropriate minimum level. For example, the accidental inclusion of telephone-grade cable, which is physically similar to higher performance LAN cables but with unacceptable bandwidth and cross-talk characteristics, into a portion of the network may result in a non-functional network connection.

Critical network parameters that the network specialist needs to know include network bandwidth (measured in terms of signal attenuation versus frequency) and near-end cross-talk (commonly referred to as "NEXT") between twisted pairs which form transmission lines in the patch cord, which also varies as a function of frequency. Both attenuation and NEXT affect the signal-to-noise ratio, an important indicator of the quality of the transmission lines. NEXT is the most critical parameter in the signal to noise ratio and directly affected by the quality of workmanship. The terms NEXT and cross-talk will be used interchangeably because the cross-talk measurements in this context occur at the near-end of the link where the worst case signal-to-noise conditions occur.

Cross-talk is a measure of the level of isolation between any two twisted-wire pairs within a LAN cable. Maintaining a specified minimum level of cross-talk isolation is important in preventing interference between adjacent twisted-wire pairs in order to maintain network reliability. The industry working group Telecommunications Industry Association (TIA) has promulgated a standard for cross-talk measurement commonly referred to as TSB 67 which specifies a minimum level of cross-talk isolation over a frequency range of 1 to 100 megahertz. The cross-talk standard essentially defines a pass-fail limit line for both basic link and channel configurations. LAN cable networks with cross-talk occurring worse than the limit line at any frequency is considered as failing. In maintaining a LAN cable network that complies with the TIA standard, the network specialist can be reasonably assured of full network performance with no significant error contributions from cross-talk between twisted-wire pairs.

A patch cord is the assembly of flexible patch cable with a plug at each end. Patch cords are an essential element of a link connecting a workstation with other LAN equipment. The link starts with the patch cord at one end of the link. The plug of the patch cord plug connects to the jack of the fixed wiring portion of the building. At the other end, the cable terminates in a jack, and another patch cord is used to make the connection to the equipment or network interface at the other end. Plugs and jacks are both connectors and, while plugs mate with jacks, the terms may be used interchangeably.

The fixed wiring of a building (configuration is often the basic link as defined in the TSB 67 standard) may be checked by itself to determine the quality of workmanship and components that are part of the fixed wiring of a building. When the equipment is installed, user patch cords are used to provide the final interconnection at each end. Frequently, however, the end-to-end link (which is the "channel" configuration in TSB 67) is not tested.

It has been found that the quality of patch cords at each end of the end-to-end link has a very significant impact on the overall transmission quality of the link. Even though the cable and plugs that make up the patch cord are themselves compliant with appropriate cross-talk standards, the assembled patch cord, when used as part of a user link, may cause this user link configuration to be out of compliance. In addition, the patch cord is often subject to physical abuse due to its physical exposure in user work areas. Patch cords are typically manufactured and sold in predetermined lengths, for example two meters, with the modular (RJ-45) plugs installed on both ends of flexible patch cable.

The quality of the connection between each of the twisted-wired pairs of the patch cable to the contacts within the connectors on each end is collectively referred to as quality of workmanship. The quality of workmanship of the connection from patch cable to the plugs is critical for overall user link performance. It is desirable that the patch cord be tested by the manufacturer of the patch cord in order to assure with high confidence that when this patch cable is used with the fixed wiring in a building, which has been separately tested, the end-to-end link performance will be satisfactory.

Both in a laboratory environment and in the field, there are substantial difficulties in measuring a patch cord to an acceptable level of accuracy to assure that a link will remain in compliance with industry standard requirements when the patch cord is used in a user link. Test instrumentation employing swept-frequency, analog measurement techniques do not allow for the removal of reflections between the near-end and far-end of the patch cord as well as additional parasitic coupling effects resulting from common mode signals which can develop between the wire pairs. Industry standards for patch cords that are under development use laboratory grade vector network analyzers, which tend to be bulky, expensive and unsuitable for service environments. Sophisticated de-embedding techniques must be employed in order to determine the quality of workmanship of the connection from patch cable to plugs. These techniques are not readily amenable to controlling workmanship in the high production volumes in the manufacturing environment, and have shown to have limited correlation with the performance of patch cords when used in a link.

In U.S. Pat. No. 5,532,603, CROSS-TALK MEASUREMENT APPARATUS WITH NEAR-END COMPENSATION, issued Jul. 2, 1996, to Jeffrey S. Bottman, Fluke Corporation assignee, the cross-talk effects of the near-end connector coupled directly to the test instrument are measured separately from the rest of the LAN cable system and then mathematically subtracted from the cross-talk measurement of the LAN cable system. This technique takes advantage of the fact that, although the cross-talk characteristic of a given near-end connector is not known, its physical location and corresponding location in the time record are known, allowing the cross-talk effects of the near-end connector to be separately measured. During the course of a cross-talk measurement, the near-end cross-talk effects of the near-end network connector coupled to the test instrument are measured and then mathematically subtracted from the composite measurement that includes both the near-end connector and the remainder of the LAN cable system, leaving only the response of the LAN cable system for a more accurate measurement.

Patch cords have a substantially different set of measurement problems from those of a typical LAN cable system. With a typical length of two meters, patch cords are substantially shorter in length than a typical LAN cable system. Because the connectors on either end of the patch cord typically have the greatest effect on cross-talk, with no significant amount of physical separation and electrical attenuation to reduce the effects of reflections from impedance mismatch and excess cross-talk from common mode signals that echo back and forth between the connectors, it becomes necessary to separate the near-end and far-end cross-talk responses in the time domain in order to accurately determine the quality of workmanship at each end of the patch cord. Because the phase relationship between the cross-talk between the near-end and the far-end of the patch cord is essentially random and unknown, there may occur voltage cancellation and reinforcement between the near-end and far-end cross-talk responses, thereby degrading the accuracy of the quality of workmanship measurement. Cross-talk measurements on each end of the patch cord are required to accomplish this separation between the near-end and far-end cross-talk responses.

Therefore, it would be desirable to provide a LAN cable test instrument which measures the cross-talk response of a LAN patch cord over the desired frequency range of 1 to 100 megahertz and which removes the effects of the reflections and excess cross-talk from the opposite end of the patch cord to obtain a cross-talk measurement of sufficient accuracy to determine the quality of the connector and cable combination, collectively referred to as quality of workmanship, on each end of the patch cord. It would be further desirable to provide a remote unit working in conjunction with and an extension of the test instrument on the far-end of the patch cord to achieve a fully automated test of the patch cord without having to reverse the patch cord ends.

SUMMARY OF THE INVENTION

In accordance with the present invention, a pulse-based LAN cable test instrument provides a measurement of the cross-talk characteristic of a LAN patch cord as a function of frequency in order to evaluate its relative performance and quality of workmanship.

A LAN cable test instrument applies a test signal in the form of narrow-width pulses to a selected transmission line of a LAN patch cord while the cross-talk response induced in another transmission line in the same LAN patch cord is measured and stored as a near-end pulse response time record in digital memory. A remote unit that works in cooperation with the test instrument is employed to measure the cross-talk performance of the far-end connector of the patch cord to produce a far-end pulse response time record without having to reverse the patch cord connectors with the test instrument.

Alternatively, the test instrument may be connected to the near-end of the patch cord for measuring the NEXT performance of the patch cord first on one end and then on the other by successively plugging in the connectors to be measured without using the remote unit.

Because there is no digital compensation of the near-end connector cross-talk, the test instrument connector and the remote unit connector must be prequalified to provide a predetermined amount of cross-talk when connected to a nominal connector. The NEXT of 3,6-4,5 pair combination is generally considered the worst case in a modular connector (RJ-45). Standard TIA/EIA-568-A Section B.5 contains detailed information on the procedure to construct a reference plug and requirements for NEXT when tested by itself. For the purpose of prequalifying the instrument jack, the plug shall exhibit 40.5 dB±0.5 dB at 100 megahertz for the 3,6-4,5 pair combination. When this plug is mated with the instrument connector, the NEXT so obtained shall be 40.5±0.5 dB at 100 megahertz for the same pair combination.

Tighter tolerances and more extensive procedures than TIA/EIA-568-A provide potential for higher accuracy. It is possible that the deviation between the time response from a nominal jack and the actual test instrument jack is stored in calibration memory and the measured time responses from actual patch cords are corrected with this deviation. This refinement was not used because it was possible to control the performance of the instrument jack to be acceptably close to the nominal values shown above.

For each measurement, near-end and far-end pulse response time records are built over a series of measurements using a sequential sampling technique to improve the effective time resolution of the measurement. In the near-end pulse response time record, the near-end and far-end pulse responses are separated, with the far-end response being discarded. Similarly, in the far-end pulse response time record, the far-end and the near-end pulse response are separated, with the near-end response being discarded.

The test instrument then obtains a frequency domain representation of the near-end cross-talk response and of the far-end cross-talk response by performing a discrete Fourier transform on the near-end and far-end pulse response time records respectively to provide cross-talk versus frequency information. The frequency domain representations may then be compared with a specification limit line to reach a pass-fail decision which is communicated to the instrument user, typically using a visual display contained in the test instrument. In this way, quality of workmanship may be evaluated for each end of the patch cord separately and with enhanced accuracy by this separation process.

One object of the present invention is to provide a test instrument capable of measuring cross-talk between transmission lines of a LAN patch cord.

Another object of the present invention is to provide a test instrument capable of measuring cross-talk of the near-end connector and cable of a LAN patch cord as a function of frequency.

A further object of the present invention is to provide a test instrument capable of measuring cross-talk of a LAN patch cord using a pulse-based measurement to separate near-end and far-end cross-talk effects.

An additional object of the present invention is to provide a test instrument operating in conjunction with a remote unit coupled to opposite ends of a patch cord to achieve an automated test of the patch cord.

Other features, attainments, and advantages will become apparent to those skilled in the art upon a reading of the following description when taken in conjunction with the accompanying drawings.

DETAILED DESCRIPTION OF THE INVENTION

Figure 1:
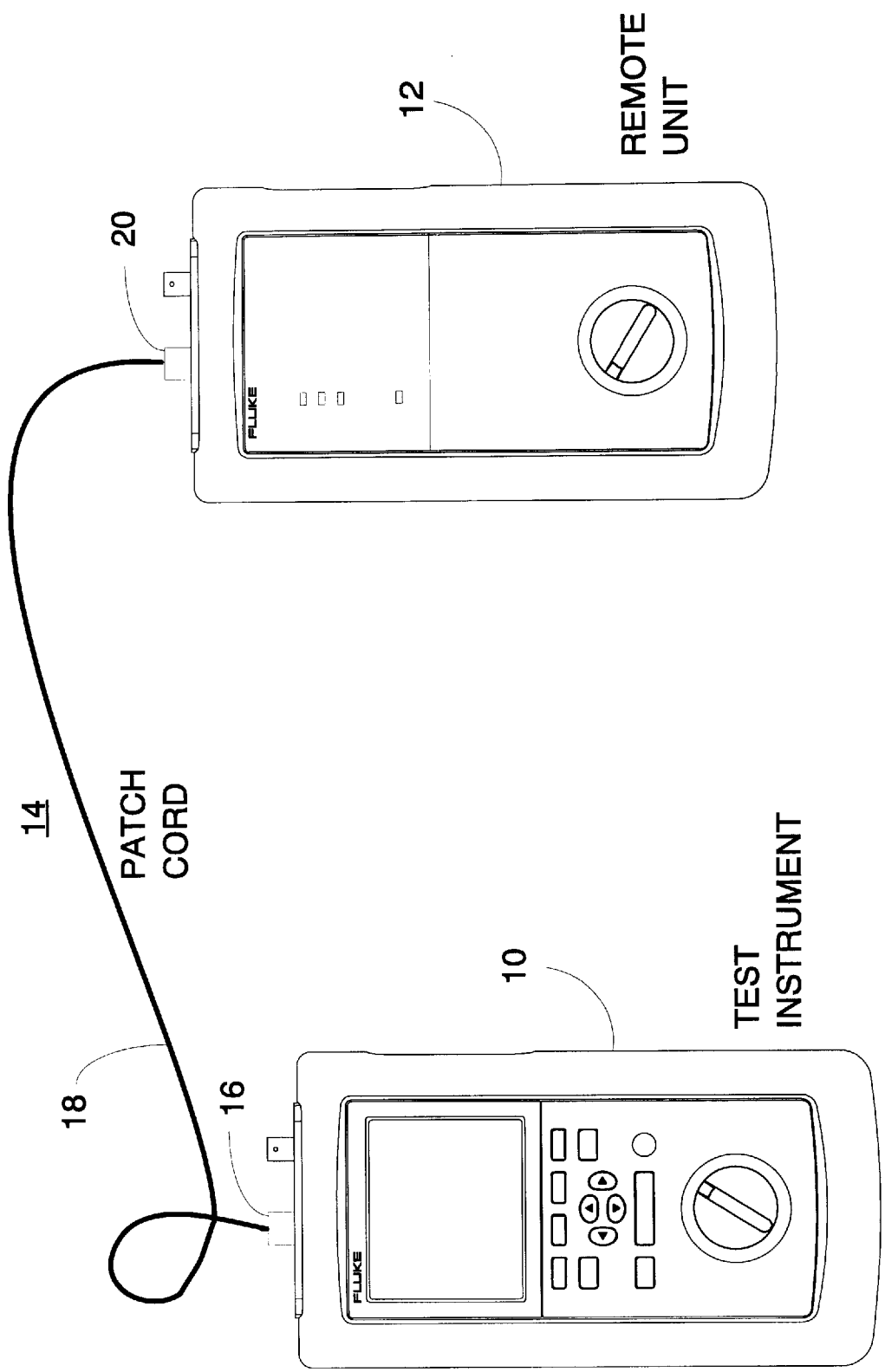
FIG. 1 is an illustration of a LAN cable test instrument and a remote unit coupled to the near-end and the far-end respectively of a LAN patch cord.

FIG. 1 is an illustration (not to scale) of a test instrument 10 and a remote unit 12 coupled to the near-end and the far-end respectively of a patch cord 14. The terms near-end and far-end are adopted by convention to mean the respective ends of LAN patch cord, with the near-end coupled to the test instrument 10 and the far-end being the opposite end. The test instrument 10 is coupled via a near-end connector 16 and a cable 18 to a far-end connector 20. The near-end connector 16 and far-end connector 20 and the cable 18 collectively make up the patch cord 14. The near-end connector 16 and far-end connector 20 are typically modular-type connectors according to the international standard IEC 603-7 with pin assignments of type "RJ-45" which is referred to as a modular (RJ-45) connector. Modular (RJ-45) connectors may be in the form of plugs or jacks. A mated plug and jack is considered a connection. In almost all cases, the near-end connector 16 and far-end connector 20 are modular plugs which mate with modular jacks in the test instrument 10 and the remote unit 12.

To fully test the patch cord 14, the NEXT measurement must be made sequentially from each end of the patch cable 14. In the preferred embodiment, to facilitate the testing of both the near-end and far-end connections through the patch cord 14, the remote unit 12 is coupled to the far-end connector 20 as shown in FIG. 1. The remote unit 12 performs the same set of measurement functions as the test instrument 10 in a coordinated fashion so that the measurements are carried out at a time different from each other so as to avoid interference between the respective measurements. The processing of the measurement information to produce measurement results from the far-end measurement may take place within either the test instrument 10 or the remote unit 12. The remote unit 12 makes the complete testing of the patch cord 14 more convenient but is not required in order for the test instrument 10 to perform the far-end measurement.

Under an alternative embodiment of the present invention, the patch cord 14 is measured by the test instrument 10 coupled to the near-end connector 16, the near-end and far-end of the patch cord 14 are swapped, and the patch cord 14 is again measured by the test instrument 10 coupled to the far-end connector 20. Using only the test instrument 10, sequential testing of each end of the patch cord 14 may be performed to completely test the patch cord 14.

Figure 2:
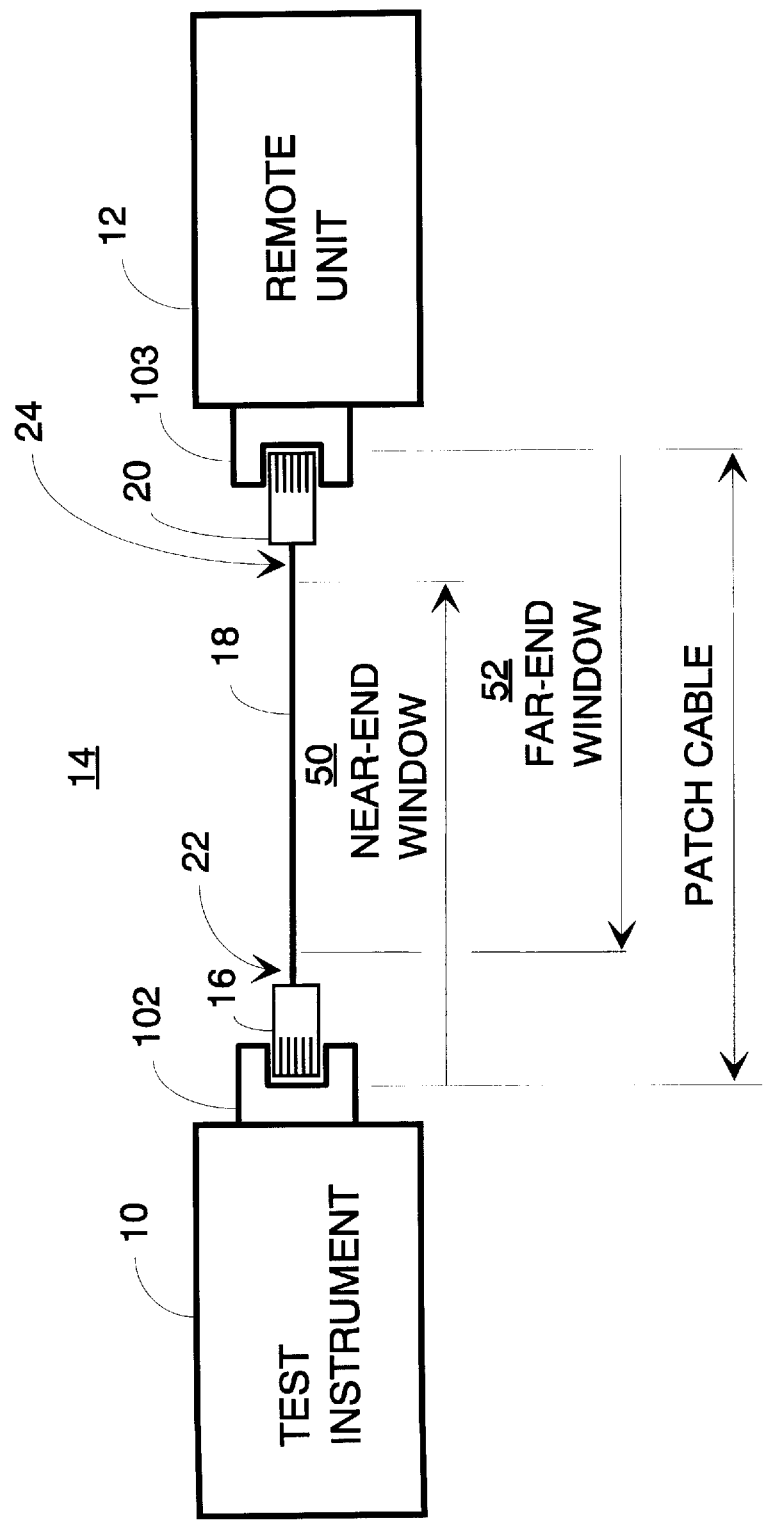
FIG. 2 is a schematic diagram of the LAN patch cord of FIG. 1 as tested by the LAN cable test instrument and the remote unit according to the present invention.

FIG. 2 is a schematic diagram that electrically defines the patch cord 14 for the purposes of a cross-talk measurement. Patch cord 14 is typically comprised of four twisted-wire pairs (not shown) within the cable 18 that function as parallel transmission lines. The wire pairs are twisted together within the cable 18 in such a way as to maximize the signal isolation or cross-talk between any two wire-pairs. The key in achieving a desired level of cross-talk performance is in maintaining both balanced capacitance and balanced mutual inductance between any two twisted pairs in the patch cord 14 so that signal voltages in one twisted pair do not induce voltages in another twisted pair. This capacitance and mutual inductance balance has become increasingly critical as the frequency of the signal voltage has increased due to higher data rates sent through the patch cord 14. The cross-talk performance of the connections of each of the wire pairs within the cable 18, collectively referred to as quality of workmanship, between the cable 18 and both the near-end connector 16 and far-end connector 20 may have a substantial effect on the capacitance and mutual inductance balance because of the physical geometry of the individual wires as they are separated from the cable 18 to be connected to the associated electrical contact within the near-end connector 16 and far-end connector 20. These connections are made in area 22 and area 24 respectively as shown in FIG. 2.

On either end of the LAN cable 14 are the near-end connector 16 and far-end connector 20 which mate with other LAN cable connectors to form the desired electrical connections according to industry convention. The near-end connector 16 and far-end connector 20 are typically modular connectors (RJ-45) but may comprise any of a variety of multiple contact connectors that may be suitable for the particular application. Because of improvements in the cable 18, the primary source of cross-talk is now typically the near-end connector 16, the far-end connector 20, and the associated connections to the cable 18 in the areas 22 and 24. Thus, a critical parameter to be evaluated in the patch cord 14 is the cross-talk performance of the assembled connections between the cable 18 and the near-end connector 16 and far-end connector 20.

Separating the individual contributions to cross-talk between the near-end and the far-end is problematic using swept-frequency, continuous wave (CW) techniques because of the severe reflections that take place within the patch cord 14 primarily due to the near-end connector 16 and far-end connector 20 which combine with the cross-talk that is desired to be measured and which are not readily separable in the frequency domain. The present invention provides for a time domain, pulse based method of measurement in which the cross-talk contributions from the near-end may be separated from those of the far-end of the patch cord 14 in the time domain as explained in more detail below.

In FIG. 2, the patch cord 14 is electrically mated with an instrument connector 102 of the test instrument 10 and a remote unit connector 103 of the remote unit 12 respectively to form connections. Because electrical signals propagate through cables at a velocity that is known with relative precision, typically around 67% of the speed of light in a vacuum, locations along the cable may be defined in terms of time or distance. Pulse-based measurements in the time domain take advantage of the time and distance duality because locations in the pulse response time record that are collected may be closely correlated to physical locations along the patch cord 14.

The electrical portion of the patch cord 14 extends from the mated connection at the near-end to the mated connection at the far-end of the patch cord 14. In measuring the near-end pulse response of the patch cord 14, only a certain length along the patch cable 14 defined by a near-end window 50 is used. The near-end window 50 has a length chosen so that any far-end pulse response has not had sufficient time to propagate back to the near-end of the patch cord 14 to interfere with the near-end measurement. The far-end pulse response is thus separable from the near-end pulse response in the time domain, defined as the pulse voltage versus time. Likewise, a far-end window 52 also has a length chosen so that any near-end pulse response has not had sufficient time to propagate back to the far-end of the patch cord 14 to interfere with the far-end measurement.

In the preferred embodiment, the near-end window 50 may include all the area of the patch cord 14 up to but excluding the area 24 and far-end connector 20 which tend to have substantial far-end reflections. Similarly, the far-end window 52 may include all the area of the patch cord 14 up to but excluding the area 22 and the near-end connector 16 which tend to have substantial near-end reflections. The near-end window 50 may be as short as to cover only the near-end connector 16 and the area 22 and the associated ringing. Similarly, the remote unit window 52 may be as short as to cover only the far-end-connector 103 and the area 24 and the associated ringing. The minimum length of the patch cord 14 that may be tested in the preferred implementation is approximately one meter. Testing the patch cord 14 in shorter lengths may be possible depending on the desired level of accuracy of the cross-talk measurement, the time resolution of the samples that are sampled by the digitizer 79, the available pulse width of the stimulus signal, and the physical ringing time due to the cross-talk of the near-end connector 16 and far-end connector 20 and the connections in the areas 22 and 24, and the quality of signal estimation. These parameters may be readily traded off and the present invention modified accordingly with a reasonable amount of experimentation.

Figure 3:
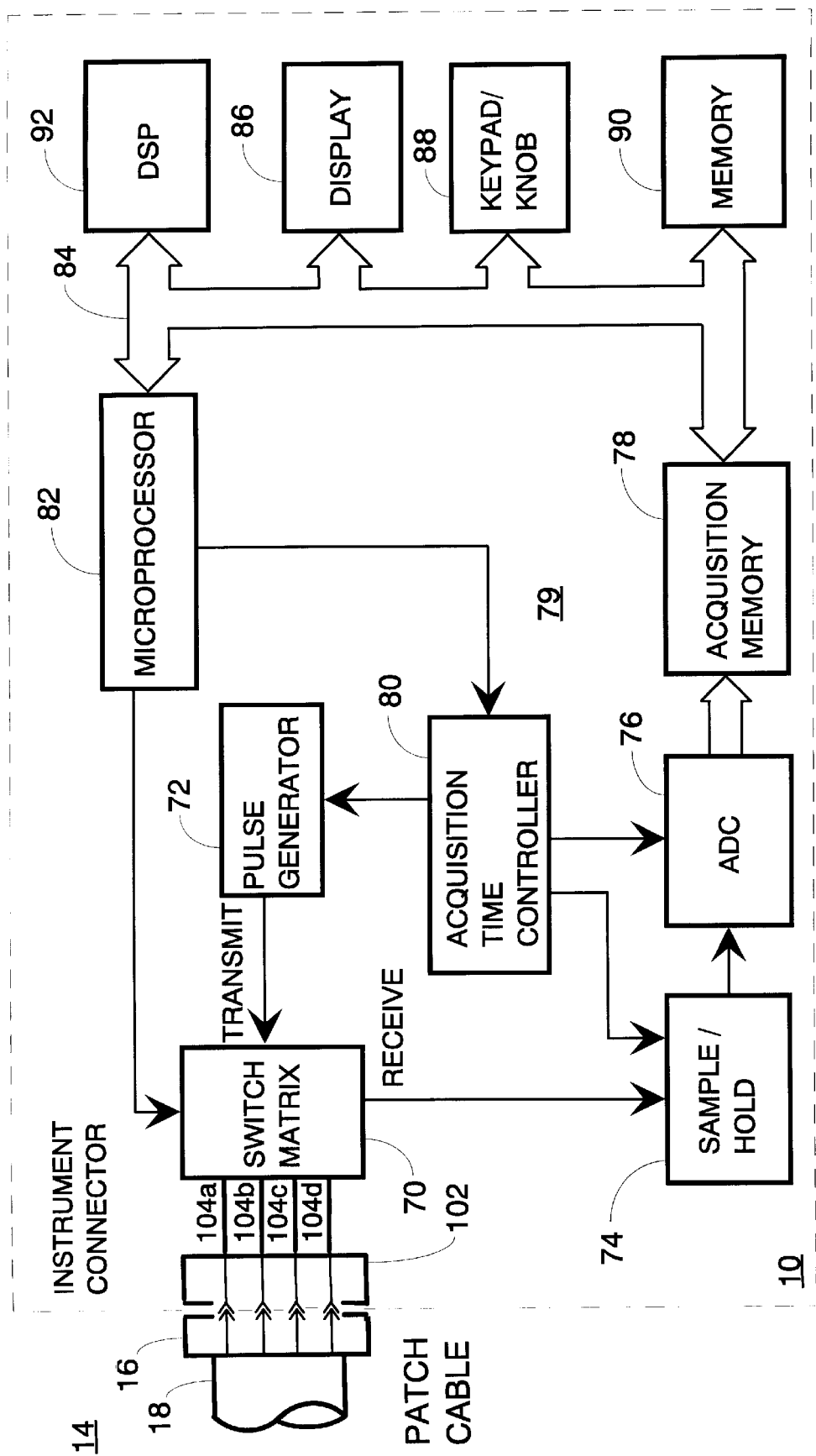
FIG. 3 is a simplified block diagram of the LAN cable test instrument of FIG. 1 according to the present invention.

FIG. 3 is a simplified block diagram of the test instrument 10 (shown in FIG. 1) according to the present invention. The near-end connector 16 is coupled to the instrument connector 102. Each of a set of wire pairs 104a–d contained within the patch cord 14 is coupled to the instrument connector 102 according to industry convention.

In order for the test instrument 10 to properly make the near-end cross-talk measurement, the instrument connector 102 and remote unit connector 103, both typically in the form of a modular (RJ-45) jack, must be prequalified to provide a predetermined amount of cross-talk when connected to a nominal modular (RJ-45) plug (not shown). The modular plug has known cross-talk characteristics when it is substituted for the near-end connector 16 during a qualification phase of the instrument connector 102 and remote unit connector 103.

Because there is no digital compensation of the near-end connector cross-talk, the test instrument connector 102 and the remote unit connector 103 must be prequalified to provide a pre-determined amount of cross-talk when connected to the nominal modular plug. The NEXT of 3,6-4,5 pair combination is generally considered the worst case. The standard TIA/EIA-568-A Section B.5 contains detailed information on the procedure to construct a reference plug and requirements for its NEXT when tested by itself.

For the purposes of prequalifying the instrument connector 102, the nominal modular plug shall exhibit 40.5 dB±0.5 dB at 100 megahertz for the 3,6-4,5 pair combination. When the nominal modular plug is mated with the instrument connector 102, the NEXT so obtained shall be 40.5±0.5 dB at 100 megahertz for the same pair combination. Tighter tolerances and more extensive procedures than those described in TIA/EIA-568-A Section B.5 provide potential for higher accuracy. It is possible that the deviation between the time response from a nominal jack and the actual test instrument jack may be stored in calibration memory and the measured time responses from actual patch cords are corrected with this deviation. This refinement was not used because it was possible to control the performance of the instrument connector 102 to be acceptably close to the nominal values shown above. The remote unit connector 103 is prequalified in substantially the same manner. It will be noted that the process of prequalifying the instrument connector 102 is not the same as the calibration phase of the test instrument 10 as explained in further detail below.

The wire pairs 104a–d are further coupled to a switch matrix 70 which selectively couples one of the wire pairs 104a–d to an output of a pulse generator 72 and selectively couples another of the wire pairs 104a–d to an input of a sample-and-hold circuit (S/H) 74 which captures a voltage level present at the input upon receipt of a signal at a control input. Each wire pair is essentially a balanced transmission line. The output of the pulse generator 72 and the input of the S/H 74 are unbalanced or referenced to ground in the preferred embodiment of the present invention, requiring the addition of transformers (not shown) for each wire pair to convert from a balanced to an unbalanced transmission line. The wire pairs 104a–d are drawn as single lines because each pair constitutes a single transmission line.

The pulse generator 72 sends a stimulus signal in the form of stimulus pulses which are narrow-width square pulses on receipt of a signal at a control input. The stimulus pulses provided by the pulse generator 72 are of a sufficiently narrow pulse width as to provide signal energy over the frequency range of interest. In the preferred embodiment, a pulse width of five nanoseconds was chosen to provide a stimulus signal for measurements in the range of 1 to 100 megahertz for the testing of the patch cord.

An output of the sample-and-hold circuit 74 is coupled to an input of an analog-to-digital converter (ADC) 76 which digitizes the voltage level received from the S/H 74 on receipt of a signal at a control input. An output of the ADC 76 is coupled to an acquisition memory 78 which stores the digital measurements as a digital time record on receipt of a signal at a control input. An acquisition time controller 80 is coupled to the control input of each of the S/H 74, ADC 76, and pulse generator 72 to facilitate a repetitive digital sampling process that achieves a high equivalent sampling rate with a minimum of timing errors by the coordinated generation of the control signals at the proper times to the respective control inputs of the S/H 74, ADC 76, and pulse generator 72. The S/H 74, ADC 76, acquisition time controller 80 and acquisition memory 78 together comprise a digitizer 79 which digitizes the received pulse responses using repetitive sequential sampling to obtain a higher equivalent sampling rate than is readily obtainable with real-time sampling techniques.

In the preferred embodiment of the present invention, the equivalent sampling rate of the digitizer 79 is 500 megasamples per second, or conversely, a time resolution of 2 nanoseconds per point and the stimulus pulses have a minimum pulse width of 5 nanoseconds. The measurement process is then one of assembling a 4,096 point time record sample by sample with 2 nanosecond resolution in the acquisition memory 78 at an actual sample rate of approximately 4 megahertz. A 4,096 point discrete Fourier transform is then calculated to obtain the frequency domain representation of the time record.

A microprocessor 82 controls the overall measurement process and is coupled to a control input of the switch matrix 70 to select the respective wire pairs to measure and to a control input of the acquisition time controller 80 to control the acquisition process. The microprocessor 82 is further coupled to a display 86, a keypad/knob 88, a memory 90, and a digital signal processor (DSP) 92 via an instrument bus 84. Instrument bus 84 contains parallel data and address lines to facilitate communications between the devices in a manner well known in the electronics field. A time record collected in the acquisition memory 78 is transferred to the memory 90 for storage or further digital manipulation such as discrete Fourier transform.

The DSP 92, a special-purpose signal processing circuit, may be used in lieu of the microprocessor 82 to convert a time record into a frequency domain representation using a discrete Fourier transform function. The DSP 92 is a commercially available signal processor integrated circuit that is typically faster at performing fast Fourier transforms than a general purpose microprocessor at equivalent clock speeds. The keypad/knob 88 and display 86 comprise the user interface of the instrument 10. The memory 90 is used to store digital time records, frequency domain representations, and instrument calibration data and may be comprised of a single integrated circuit or multiple integrated circuits using technologies well known in the electronics field.

The block diagram of FIG. 3 for the test instrument 10 also applies in whole or in part to the remote unit 12. The remote unit 12 may comprise the entire block diagram, essentially duplicating the functions of the test instrument 10. Alternatively, the remote unit may comprise only the portions of the block diagram essential to conduct a measurement and obtain a time record. This reduced functionality in the remote unit 12 may readily be accomplished comprising only the remote unit connector 103 and a digitizer 79', a pulse generator 72', and a switch matrix 70' (not shown) if further processing is performed in the test instrument 10. A means of coupling the time record collected by the digitizer 79' back to the test instrument 10 would have to be provided. It is desirable that the remote unit 12 further communicate with the test instrument 10 in timing their respective measurements and in sharing results in order to obtain an integrated test of the patch cord 14. In the preferred embodiment, this communication between the test instrument 10 and the remote unit 12 takes place via the patch cord 14.

Figure 4A:
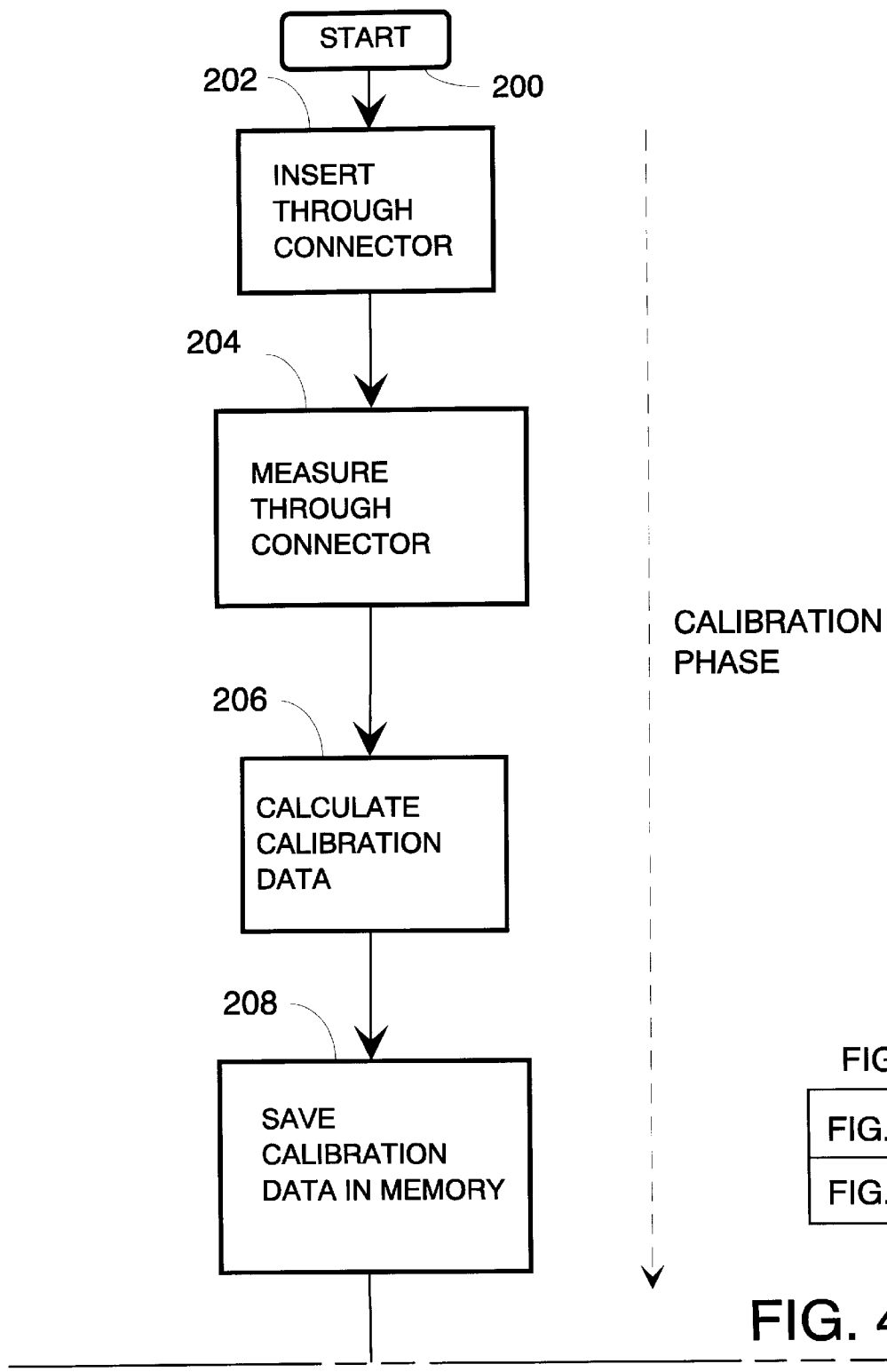
FIGS. 4A–4B is a flow chart of the overall measurement process employed by the LAN cable test instrument of FIG. 1 according to the present invention.
Figure 4B:
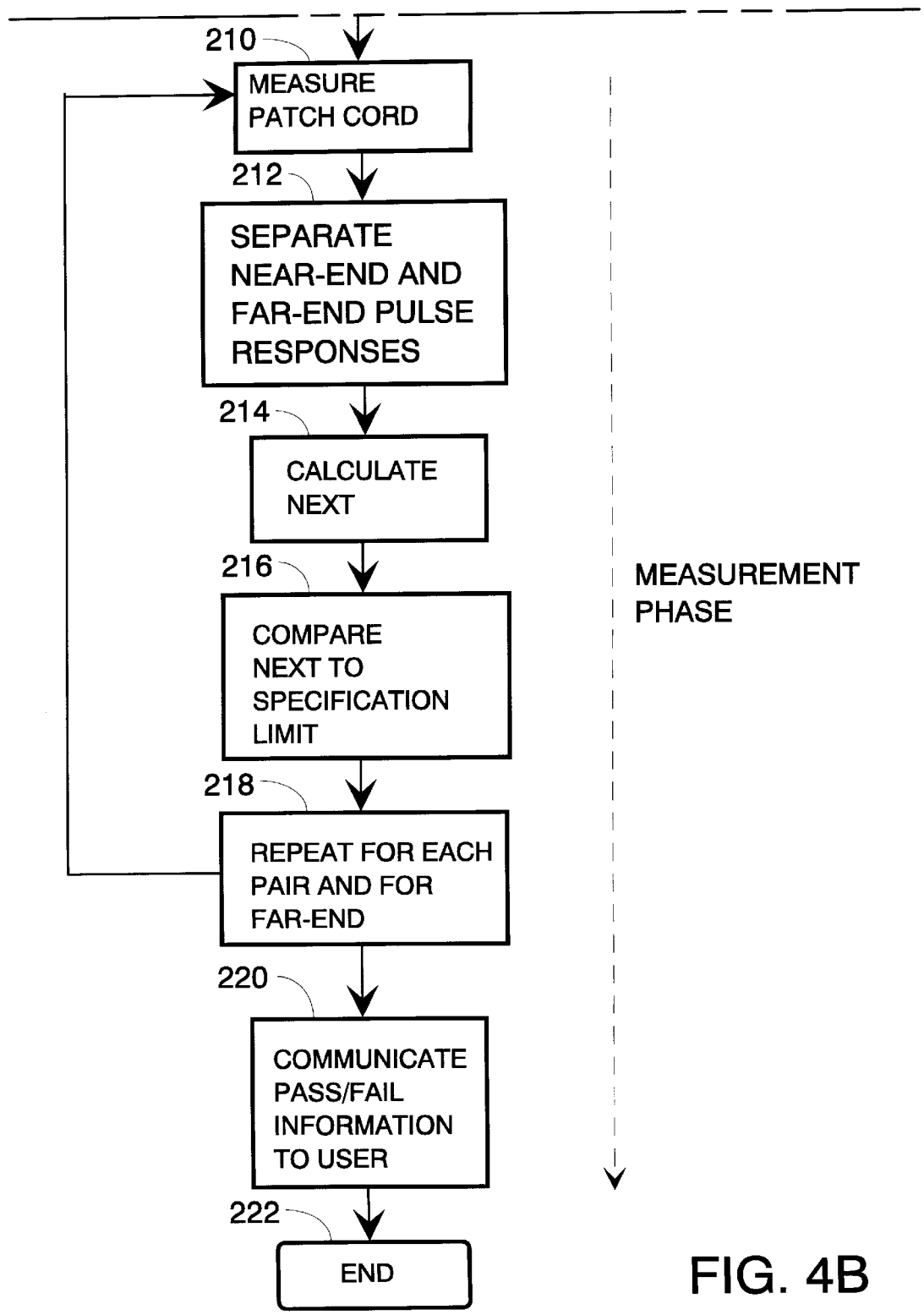

FIGS. 4A–4B together comprise a flow chart of the overall measurement process employed by the test instrument 10 according to the present invention. FIG. 4A covers the calibration phase of the test instrument comprising the steps of inserting and measuring a calibration artifact for any given pair of transmission lines and obtaining normalization data which may be stored in the memory 90 (shown in FIG. 3). The calibration phase is necessary in order to obtain a measurement of the test signal generated by the pulse generator 72 as measured by the digitizer 79. FIG. 4B covers the measurement phase comprising the steps of measuring the near-end pulse response across the near-end window of the patch cord 14, calculating the NEXT over the desired frequency range, and comparing the NEXT against a predetermined limit line. The near-end pulse response is normalized against the normalization data in order to obtain a NEXT measurement with higher accuracy.

Arriving at a composite cross-talk response requires using a substantial amount of data storage and mathematical manipulation. Two primary types of data records are employed in the present invention: time domain records and frequency domain records. Frequency domain records are related to their equivalent time domain records via the Fourier transform and the data are in the form of complex numbers with real and imaginary components. Time domain records contain only real data with no imaginary components. By convention, the time domain records are assigned names in lower case letters and the equivalent frequency domain records are assigned the same names but in upper case.

The following table summarizes all of the variables relevant to the measurement process steps explained in FIGS. 4A–4B. Each of the variables represents a series of data stored as an array data structure with individual data points normally accessible by use of indices in a manner well known in the computer field.

norm—the calibration pulse response time record obtained when the transmit and receive channels are connected together where "norm" refers to normalization data NORM—the frequency domain representation of norm which represents the 0 dB reference level for normalizing cross-talk measurements where "NORM" refers to normalization data.

cut—the time record of the pulse response of the LAN cable system with the transmit channel coupled to a transmission line and the receive channel coupled to another transmission where "cut" refers to cable under test.

CUT—the frequency domain representation of cut where "CUT" refers to cable under test.

NCR—the normalized cross-talk response which is the ratio of CUT to NORM.

PCNXT—the patch cord near-end cross-talk response, which is NCR expressed in terms of decibels.

Referring now to FIG. 4A, the measurement process according to the present invention begins with a step 200 labeled START in which the test instrument 10 (shown in FIG. 3) may be first started and initialized.

Step 202 labeled INSERT THROUGH CONNECTOR is an instrument calibration process in which the five nanosecond width pulses generated by the pulse generator 72 over the TRANSMIT line (shown in FIG. 3) are coupled via a through connector (not shown) to the RECEIVE line and the S/H 74. The through connector has a substantially lossless, 0 decibel reference connection which replaces the connector 16 during the calibration phase of the test instrument 10 and which comprises a direct electrical connection between a selected combination of wire pairs chosen to correspond with the setting of the switch matrix 70. The calibration phase may be performed only as needed and typically only on an annual basis as part of a predetermined calibration schedule.

In step 204 labeled MEASURE THROUGH CONNECTOR, the test instrument 10 measures the pulses generated by the pulse generator 72 (shown in FIG. 3) to obtain a normalized pulse response time record. The calibration pulse response time record containing the 4,096 point measured pulse response record is symbolically named "norm" and is stored in the memory 90. Each pulse response time record is a symbolic representation of the amplitude data stored as a time record in the form of an array data structure with individual data points within the array which are accessible via an array index.

In step 206, labeled CALCULATE CALIBRATION DATA, the frequency representation of the calibration pulse response time record is calculated using a fast Fourier transform in a matter well known in the electronics field using the DSP 92 (shown in FIG. 3) or, alternatively, using the microprocessor 82. In the preferred embodiment of the present invention, the chosen length of the pulse response record is 4096 points, which is a power of 2 to facilitate the fast Fourier transform (FFT), an efficient implementation of the discrete Fourier transform algorithm employed by the DSP 92.

NORM=FFT (norm)

NORM, in upper case, is the frequency domain representation of the calibration pulse response time record norm which represents the calibration data of the instrument 10. The calibration data contained in NORM are complex values which vary as a function of frequency. In the preferred embodiment of the present invention, a set of calibration data would normally be acquired and stored in the memory 90 for every combination of twisted pairs that would be measured.

In step 208 labeled SAVE CALIBRATION DATA IN MEMORY, the calibration data are stored in the memory 90 (shown in FIG. 3). The DSP 92 produces data files containing complex numbers which comprise real and imaginary components which are stored as NORM in the memory 90 as array data structures. The steps 202, 204, 206, and 208 for obtaining calibration data are typically performed as a factory calibration of the test instrument 10 and the NORM data are stored in memory 90 on a semi-permanent basis until the next instrument calibration. A typical period between factory calibrations is twelve months in the preferred embodiment of the present invention.

Referring now to FIG. 4B, the measurement phase begins with a step 210 labeled MEASURE PATCH CORD. The same selected wire pairs corresponding to the wire pairs chosen in the steps 202–208 (shown in FIG. 4A) for the calibration measurement, are chosen for measurement in the step 210. In the step 210, the patch cord 14 is coupled to the test instrument 10 by mating the connector 16 with the instrument connector 102 (shown in FIG. 3). The near-end of the patch cord between a first and second wire pairs is measured by repetitively sampling a stream of stimulus pulses received from the first wire pair as induced by the pulse generator 72 into the second wire pair. The pulse response induced by the stimulus pulses at selected time intervals is then measured and stored at the appropriate location in the time record in the acquisition memory 78 (shown in FIG. 3). In the preferred embodiment, a five nanosecond width stimulus pulse was chosen because it provides adequate time resolution necessary to separate the pulse response of the near-end and far-end of the patch cord 14 at a desired minimum length. Completed pulse-response time records of the patch cord 14 are then stored in memory 90 as array data structures corresponding to "cut" meaning "cable under test." In step 212, labeled SEPARATE NEAR-END AND FAR-END PULSE RESPONSES, the near-end cross-talk response of the patch cord 14 within the near-end window 50 (shown in FIG. 2) is separated from the far-end pulse response which is discarded from the measurement. The near-end cross-talk response of the patch cord 14 may be readily extracted from the data contained in "cut" because its location along the pair of transmission lines represented by the wire pairs is known and remains constant. The far-end pulse response, on the other hand, varies according to the length of the patch cord 14 and its phase relationship with the near-end pulse response is not known beforehand. For this reason, measuring the pulse response on both ends of the patch cord 14 is necessary in order to separate the relevant pulse responses necessary to calculate NEXT associated with the cable connection on each end to evaluate quality of workmanship. The location of the cross-talk pulse response according to the near-end window 52 is selected using the corresponding range of array indices of the pulse response data stored in "cut."

Figure 5:
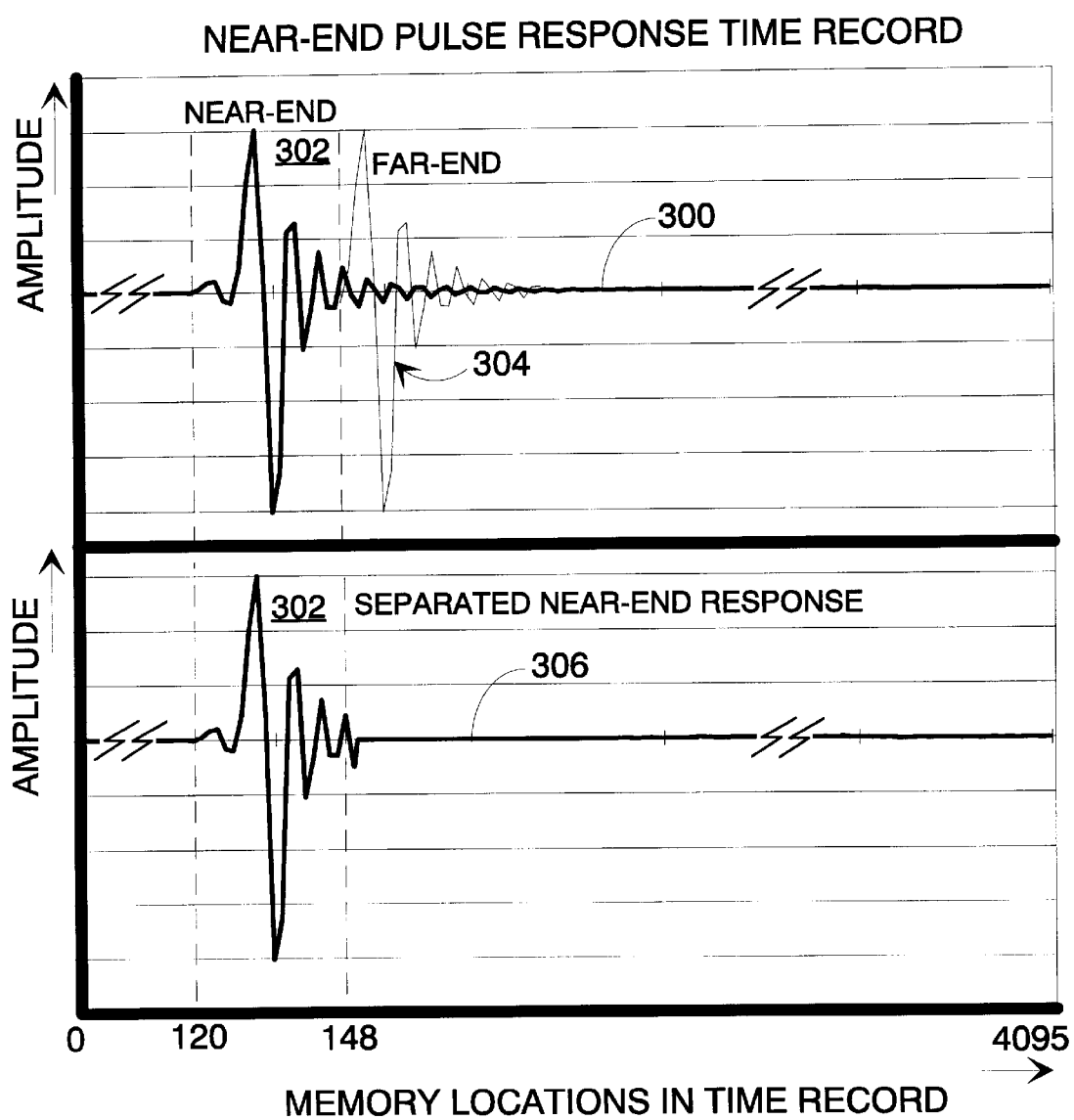
FIG. 5 is a graph illustrating the separation of the near-end and far-end pulse responses according to the present invention.

Referring now to FIG. 5, there is shown a graph illustrating the separation of the near-end and far-end pulse responses as described above. A trace 300, shown in relevant portion taken in part from the entire array of 4,096 points, is displayed according to amplitude versus array index in the pulse response time record "cut." An area 302 corresponding to the near-end window 50 is shown. A trace 304, corresponding to the far-end pulse response of the patch cord 14 is also shown superimposed on the trace 300. The position in the pulse response time record "cut" of the far-end pulse response relative to the near-end pulse response varies by the length of the patch cord 14.

The minimum length of the patch cord 14 that can be tested according to the present invention is determined by the amount of overlap between the trace 304 corresponding with the far-end pulse response into the area 302 corresponding with the near-end window 50 that can be tolerated and still maintain a desired level of measurement accuracy. Ensuring adequate separation between the near-end and far-end pulse responses requires that three critical parameters be accounted for and traded off against each other. These parameters include: (a) the minimum length of the patch cord 14 (shown in FIG. 1), (b) the pulse width of the test signal, and (c) the length of the area 302 corresponding to the near-end window 50. In the preferred embodiment of the present invention, this minimum length of the patch cord 14 is approximately one meter.

The lower trace 306 shows the truncated estimate of the near-end pulse response corresponding to the area 302 after the remaining data points outside the area 302 have been set to zero, thereby discarding the trace 304 and the far-end pulse response. As can be seen in the trace 300, some information from the near-end pulse response outside the area 302 is lost along with the far-end pulse response, thereby resulting in a relative loss of accuracy. The size of the area 302 and the minimum length of the patch cord 14 can thereby determine the level of accuracy for the workmanship measurement. Generally, the optimal amount of accuracy to determine the quality of workmanship may be obtained when the area 302 is chosen that best matches the pulse response of the near-end connector 16 and the area 22 (shown in FIG. 2).

Referring back to FIG. 4B, in step 214 labeled CALCULATE NEXT, the time record cut now contains only the near-end cross-talk pulse response which has been obtained as explained. The frequency domain representation of cut, is computed using the DSP 92 (shown in FIG. 3).

$$CUT = FFT \text{ (cut)}$$

The results of each calculation are stored in memory 90 as CUT. CUT contains the near-end frequency domain representation of the near-end pulse response time record. The far-end frequency domain representation of the far-end pulse response time record may be obtained in a like manner. The frequency resolution of the points in the data file CUT is derived using the following formula:

$$\begin{aligned}
\text{Frequency Resolution (Hertz)} &= \text{(effective sample rate/length of time record)} \\
&= 500 \text{ megahertz}/4{,}096 \text{ points} \\
&= 122.07 \text{ kilohertz per point}
\end{aligned}$$

The normalized cross-talk response represented by NCR is calculated as follows:

$$NCR = CUT/NORM$$

NORM is the normalization data obtained during the calibration phase comprising the steps 202–208. CUT is the frequency representation of the near-end cross-talk response which was obtained in steps 210–214. By normalizing the response CUT by the stimulus NORM, the normalized cross-talk response NCR of the patch cord 14 is derived which has enhanced measurement accuracy over CUT and provides for a ratio-type measurement. Finally, the near-end cross-talk pulse response of the patch cord PCNXT, expressed in decibels is calculated as follows:

$$PCNXT = 20 \log|NCR|$$

In step 216 labeled COMPARE NEXT TO SPECIFICATION LIMIT, PCNXT is compared with a specification limit line which may be calculated as the accepted pass-fail limit over the entire frequency range, in this case 1 to 100 megahertz. A pass-fail decision is then made responsive to the results of the comparison. If any of the points within PCNXT is above its corresponding specification limit, the patch cord 14 is considered as a "fail."

Figure 6:
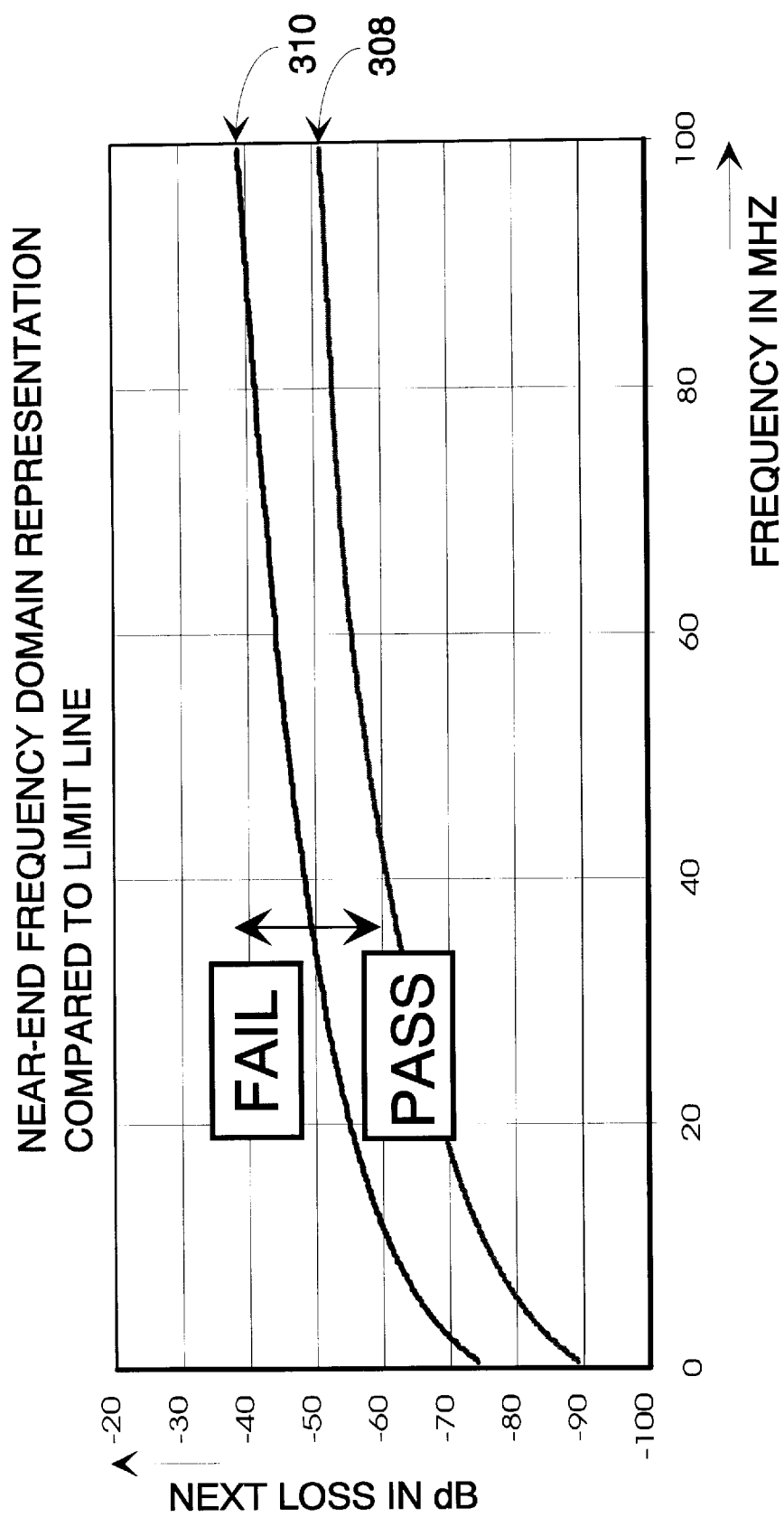
FIG. 6 is a graph illustrating the NEXT response over frequency of the LAN patch cord as calculated from the time record of FIG. 5 after separation of the far-end pulse response.

FIG. 6 is a graph illustrating the NEXT response over frequency as calculated from the time record of FIG. 5 in step 214 after removal of the far-end pulse response in step 212. In the comparison performed in step 216, the trace 308 corresponding to the near-end cross-talk response PCNXT is plotted as NEXT loss in dB over a frequency range of 1 to 100 megahertz. A limit line 310 is also plotted and corresponds to a derived value based on the maximum allowable cross-talk of a cable and connector combination over the near-end window 52.

In step 218 labeled REPEAT FOR EACH PAIR AND FOR FAR-END, a decision is made whether to repeat steps 210–216 to test the cross-talk in other desired combinations of wire pairs 104a–d in the near-end and again in the far-end of the patch cord. The far-end is measured either by reversing the ends of the patch cord 14 in the test instrument 10 or by the use of the remote unit 12 which conducts its own measurements in substantially the same manner as the test instrument 10 according to the steps 200–216. In this way, a series of pass/fail decisions according to all desired combinations of wire pairs and at the near-end and the far-end of the patch cord 14 are made.

In step 220 labeled COMMUNICATE PASS/FAIL INFORMATION TO USER, the results of the pass/fail decisions of the step 218 are communicated to the user via the display 86 (shown in FIG. 3) of the instrument 10. A graphical display of the cross-talk response of the patch cord 14 using the data contained in the memory 90 may be shown in addition to or instead of a simple pass or fail indication.

In step 222 labeled END, the measurement process ends. Under instrument control, the measurement process may automatically return to the START step 200 (shown in FIG. 4A) to begin a new measurement process to repeat the measurement continuously or simply stop and wait for further instructions.

It will be obvious to those having ordinary skill in the art that many changes may be made in the details of the above described preferred embodiments of the invention without departing from the spirit of the invention in its broader aspects. For example, the present invention may be employed to measure the cross-talk of any near-end connector and cable combination between any given pair of transmission lines of any length, as long as other significant sources of cross-talk between the transmission lines are beyond the near-end window 50. Therefore, the scope of the present invention should be determined by the following claims.

What we claim as our invention is:

1. A test instrument for measuring near-end and far-end cross-talk response in a patch cord, comprising:
   (a) first and second instrument connectors coupled to receive a near-end connector and a far-end connector of said patch cord;
   (b) first and second pulse generators for generating a first and second set of stimulus pulses in one of a selected pair of transmission lines in said patch cord;
   (c) first and second digitizers coupled to said near-end and far-end connectors for receiving cross-talk signals induced by said stimulus pulses in another of said selected pair of transmission lines to produce near-end and far-end pulse-response time records of said cross-talk signals; and (d) a microprocessor coupled to said digitizer for receiving said near-end and far-end pulse response time records, separating said near-end cross-talk response from said far-end cross-talk response, and calculating a near-end frequency domain representation.

2. A test instrument for measuring near-end and far-end cross-talk response in a patch cord according to claim 1 wherein said near-end cross-talk response is separated from said far-end cross-talk response according to a near-end window.

3. A test instrument for measuring near-end and far-end cross-talk response in a patch cord according to claim 2 wherein said near-end window is selected to exclude areas of said patch cord having said far-end cross-talk response.

4. A test instrument for measuring near-end and far-end cross-talk response in a patch cord according to claim 1 wherein said near-end frequency domain representation is normalized against calibration data.

5. A test instrument for measuring near-end and far-end cross-talk response in a patch cord according to claim 4 wherein said microprocessor generates a first decision that is one of pass and fail by comparing said near-end frequency domain representation to a limit line.

6. A test instrument for measuring near-end and far-end cross-talk response in a patch cord according to claim 5 further comprising a remote unit, said remote unit comprising:

(a) said second instrument connector coupled to receive said far-end connector of said patch cord;

(b) said second pulse generator coupled to said second instrument connector for generating said second set of stimulus pulses in said one of a selected pair of transmission lines in said patch cord at a time different from the generating of said first set of stimulus pulses; and (c) said second digitizer coupled to said second instrument connector for receiving a second set of cross-talk signals from said another of said selected pair of transmission lines and producing said far-end pulse-response time record of said second set of cross-talk signals wherein said far-end pulse-response time record is coupled to said microprocessor for separating said far-end cross-talk response from said near-end cross-talk and calculating a far-end frequency domain representation.

7. A test instrument for measuring near-end and far-end cross-talk response in a patch cord according to claim 6 wherein said far-end frequency domain representation is normalized against calibration data.

8. A test instrument for measuring near-end and far-end cross-talk response in a patch cord according to claim 7 wherein said microprocessor generates a second decision that is one of pass and fail by comparing said far-end frequency domain representation against a limit line.

9. A test instrument for measuring near-end and far-end cross-talk response in a patch cord according to claim 8 further comprising a display coupled to said microprocessor for visually displaying said first and second decisions.

10. A test instrument for measuring near-end and far-end cross-talk response in a patch cord according to claim 6 wherein said far-end cross-talk response is separated from said near-end cross-talk response according to a far-end window.

11. A test instrument for measuring near-end and far-end cross-talk response in a patch cord according to claim 10 wherein said far-end window is selected to exclude areas of said patch cord having said near-end cross-talk response.

12. A test instrument for measuring near-end and far-end cross-talk response in a patch cord according to claim 1 wherein said instrument connectors are prequalified to produce predetermined maximum levels of cross-talk within a set of tolerance values.

13. A method for measuring near-end and far-end cross-talk response in a patch cord, comprising:

(a) generating stimulus pulses in one of a pair of transmission lines at a near-end and a far-end of said patch cord;

(b) digitizing cross-talk signals induced in another of said pair of transmission lines by said stimulus pulses at said near-end and said far-end of said patch cord to produce near-end and far-end pulse response time records;

(c) separating said near-end cross-talk response from a far-end cross-talk response in said near-end and far-end pulse response time records; and (d) calculating near-end and far-end frequency domain representations of said near-end pulse response time records.

14. A method for measuring near-end and far-end cross-talk response in a patch cord according to claim 13 further comprising separating said near-end cross-talk response from said far-end cross-talk response according to a near-end window.

15. A method for measuring near-end and far-end cross-talk response in a patch cord according to claim 14 further comprising selecting said near-end window to exclude areas of said patch cord having a far-end cross-talk response.

16. A method for measuring near-end and far-end cross-talk response in a patch cord according to claim 13 further comprising separating said far-end cross-talk response from said near-end cross-talk response according to a far-end window.

17. A method for measuring near-end and far-end cross-talk response in a patch cord according to claim 16 further comprising selecting said far-end window to exclude areas of said patch cord having said near-end cross-talk response.

18. A method for measuring near-end and far-end cross-talk response in a patch cord according to claim 13 further comprising generating a decision that is one of pass and fail by comparing said near-end frequency domain representation and said far-end frequency domain representation against a limit line.

19. A method for measuring near-end and far-end cross-talk response in a patch cord according to claim 18 further comprising visually displaying said decision.

20. A method for testing cross-talk performance of a patch cord, comprising:

(a) generating stimulus pulses in one of a pair of transmission lines at a near-end of said patch cord;

(b) digitizing cross-talk signals induced in another of said pair of transmission lines by said stimulus pulses at said near-end of said patch cord to produce a near-end pulse response time record;

(c) generating said stimulus pulses in said one of a pair of transmission lines at a far-end of said patch cord;

(d) digitizing cross-talk signals induced in said another of said pair of transmission lines by said stimulus pulses at said far-end of said patch cord to produce a far-end pulse response time record;

(e) separating said near-end cross-talk response from a far-end cross-talk response in said near-end pulse response time record and in said far-end pulse response time record; and (f) calculating a near-end frequency domain representation of said near-end pulse response time record and a far-end frequency domain representation of said far-end pulse response time record.

21. A method for testing cross-talk performance of a patch cord according to claim 20 further comprising:

separating said far-end cross-talk response from said near-end cross-talk response according to a far-end window; and further separating said near-end cross-talk response from said far-end cross-talk response according to a near-end window.

22. A method for testing cross-talk performance of a patch cord according to claim 21 further comprising:

selecting said far-end window to exclude areas of said patch cord having said near-end cross-talk response; and further selecting said near-end window to exclude areas of said patch cord having said far-end cross-talk response.

23. A method for testing cross-talk performance of a patch cord according to claim 20 wherein said near-end frequency domain representation and said far-end frequency domain representation are normalized against calibration data.

24. A method for testing cross-talk performance of a patch cord according to claim 20 further comprising generating a decision that is one of pass and fail by comparing said near-end frequency domain representation and said far-end frequency domain representation against a limit line.

25. A method for testing cross-talk performance of a patch cord according to claim 24 further comprising visually displaying said decision.

* * * * *